US012575498B2

(12) United States Patent
Hunt et al.

(10) Patent No.: US 12,575,498 B2
(45) Date of Patent: Mar. 17, 2026

(54) REEL ASSEMBLY WITH RETRACTABLE SENSOR ARM FOR AN AGRICULTURAL HEADER

(71) Applicant: CNH Industrial America LLC, New Holland, PA (US)

(72) Inventors: Cory Douglas Hunt, Millersville, PA (US); Herbert Max Farley, Elizabethtown, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 757 days.

(21) Appl. No.: 17/788,356

(22) PCT Filed: Dec. 22, 2020

(86) PCT No.: PCT/US2020/066517
§ 371 (c)(1),
(2) Date: Jun. 23, 2022

(87) PCT Pub. No.: WO2021/133756
PCT Pub. Date: Jul. 1, 2021

(65) Prior Publication Data
US 2023/0023116 A1 Jan. 26, 2023

Related U.S. Application Data

(60) Provisional application No. 62/952,911, filed on Dec. 23, 2019.

(51) Int. Cl.
*A01D 57/04* (2006.01)
*A01D 41/14* (2006.01)

(52) U.S. Cl.
CPC ........... *A01D 57/04* (2013.01); *A01D 41/141* (2013.01)

(58) Field of Classification Search
CPC ......................... A01B 63/1112; A01D 41/141; A01D 41/127; A01D 41/14; A01D 57/04;
(Continued)

(56) References Cited

U.S. PATENT DOCUMENTS

| | | | |
|---|---|---|---|
| 3,906,710 A | 9/1975 | Pask | |
| 4,507,910 A * | 4/1985 | Thornley | A01D 57/00 56/DIG. 15 |

(Continued)

FOREIGN PATENT DOCUMENTS

| | | |
|---|---|---|
| AR | 242476 A1 | 4/1993 |
| AR | 098038 A1 | 4/2016 |

(Continued)

OTHER PUBLICATIONS

International Search Report and Written Opinion for PCT Application No. PCT/US2020/066517 dated Mar. 24, 2021 (17 pages).
(Continued)

*Primary Examiner* — Joseph M Rocca
*Assistant Examiner* — Robert E Pezzuto
(74) *Attorney, Agent, or Firm* — Fletcher Yoder, P.C.

(57) ABSTRACT

A reel assembly for an agricultural header including a reel arm configured to rotatably couple to a frame of the agricultural header and configured to support a reel of the reel assembly. The reel assembly further includes a device mounting assembly coupled to the reel arm and configured to support a device that is configured to monitor a terrain feature. The device mounting assembly is configured to maintain an orientation between the device and a ground on which the agricultural header is positioned as the reel arm rotates relative to the frame of the agricultural header.

20 Claims, 6 Drawing Sheets

(58) Field of Classification Search
CPC .......... A01D 75/18; G01C 7/04; G01D 11/30; F16M 11/12
See application file for complete search history.

(56) References Cited

U.S. PATENT DOCUMENTS

| | | | | |
|---|---|---|---|---|
| 4,645,320 A | * | 2/1987 | Muelling | G03B 29/00 396/419 |
| 5,015,847 A | | 5/1991 | Rouillon | |
| 5,299,413 A | | 4/1994 | Gale | |
| 5,798,863 A | * | 8/1998 | Udagawa | G02B 27/646 359/557 |
| 6,244,024 B1 | | 6/2001 | Diekhans et al. | |
| 6,397,569 B1 | | 6/2002 | Homburg et al. | |
| 6,791,488 B2 | * | 9/2004 | Diekhans | A01D 41/141 342/123 |
| 7,155,888 B2 | | 1/2007 | Diekhans | |
| 11,109,529 B2 | | 9/2021 | Fuechtling et al. | |
| 2019/0161208 A1 | | 5/2019 | Sun et al. | |
| 2022/0138925 A1 | * | 5/2022 | Anderson | G06T 7/62 382/110 |

FOREIGN PATENT DOCUMENTS

| | | |
|---|---|---|
| AR | 112555 A1 | 11/2019 |
| DE | 19956643 A1 | 1/2001 |
| EP | 2630856 A2 | 8/2013 |
| GB | 2173309 A | 10/1986 |
| WO | 2019/140512 A1 | 7/2019 |
| WO | 2020101992 A1 | 5/2020 |
| WO | 2020185873 A1 | 9/2020 |

OTHER PUBLICATIONS

Argentina Office Action for AR Application No. 20200103582, dated Sep. 10, 2024, 10 pages.

* cited by examiner

REEL ASSEMBLY WITH RETRACTABLE SENSOR ARM FOR AN AGRICULTURAL HEADER

BACKGROUND

The present disclosure relates generally to a reel assembly for an agricultural header.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester.

Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

Certain headers may also include a reel assembly, which may include a reel having multiple fingers extending from a central framework. The central framework is driven to rotate, such that the fingers move in a circular pattern. The fingers are configured to engage the crops, thereby preparing the crops to be cut by the cutter bar assembly and/or urging the cut crops to move toward the belt(s). The reel may be supported by multiple arms extending from a frame of the header. The reel assembly may include one or more actuators configured to drive the arms to rotate, thereby adjusting the position of the reel relative to the frame of the header.

BRIEF DESCRIPTION

In one embodiment, a reel assembly for an agricultural header includes a reel arm configured to rotatably couple to a frame of the agricultural header and configured to support a reel of the reel assembly. Additionally, the reel assembly includes device mounting assembly coupled to the reel arm and configured to support a device that is configured to monitor a terrain feature. The device mounting assembly is configured to maintain an orientation between the device and a ground on which the agricultural header is positioned as the reel arm rotates relative to the frame of the agricultural header.

In one embodiment, a device mounting assembly for an agricultural header includes a support structure configured to be coupled to an arm of the agricultural header, a device mounting structure coupled to the support structure, and a device coupled to the device mounting structure and configured to monitor a terrain feature. The device mounting structure is configured to maintain an orientation between the device and a ground on which the agricultural header is positioned as the arm moves relative to a frame of the agricultural header.

In one embodiment, a header for an agricultural harvester includes a cutter bar assembly coupled to a frame of the header and configured to cut crops as the agricultural harvester travels through a field, an arm coupled to the frame of the header, and a device mounting assembly configured to couple a device that is configured to monitor terrain features to the arm. The device mounting assembly is configured to maintain an orientation between the device and a ground on which the header is positioned as the arm rotates relative to the frame of the header.

DRAWINGS

These and other features, aspects, and advantages of the present disclosure will become better understood when the following detailed description is read with reference to the accompanying drawings in which like characters represent like parts throughout the drawings, wherein.

Figure 2:
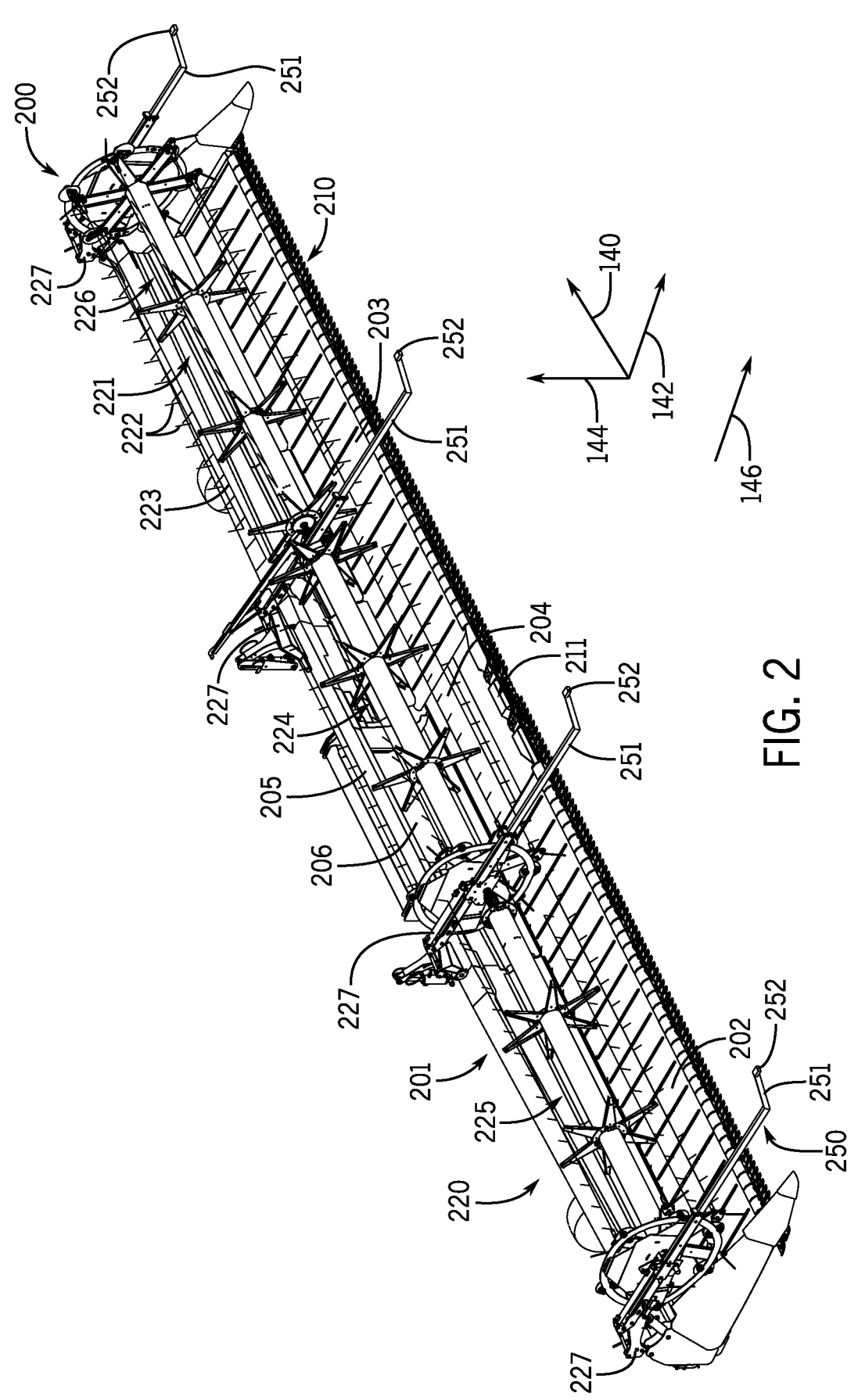
FIG. 2 is a perspective view of an embodiment of a header that may be employed within the harvester of FIG. 1, in accordance with embodiments of the present disclosure.
Figure 5:
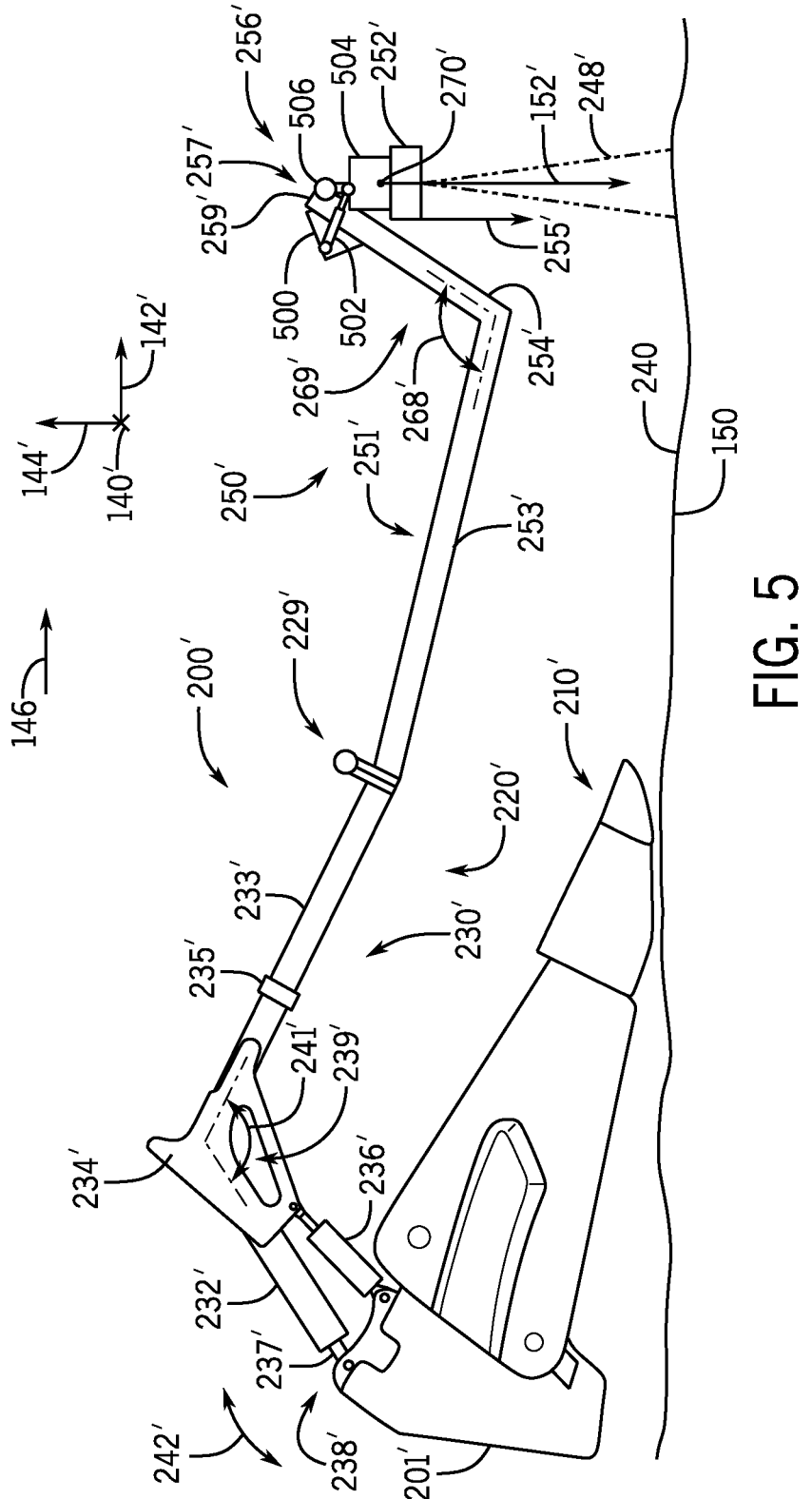
Figure 6:
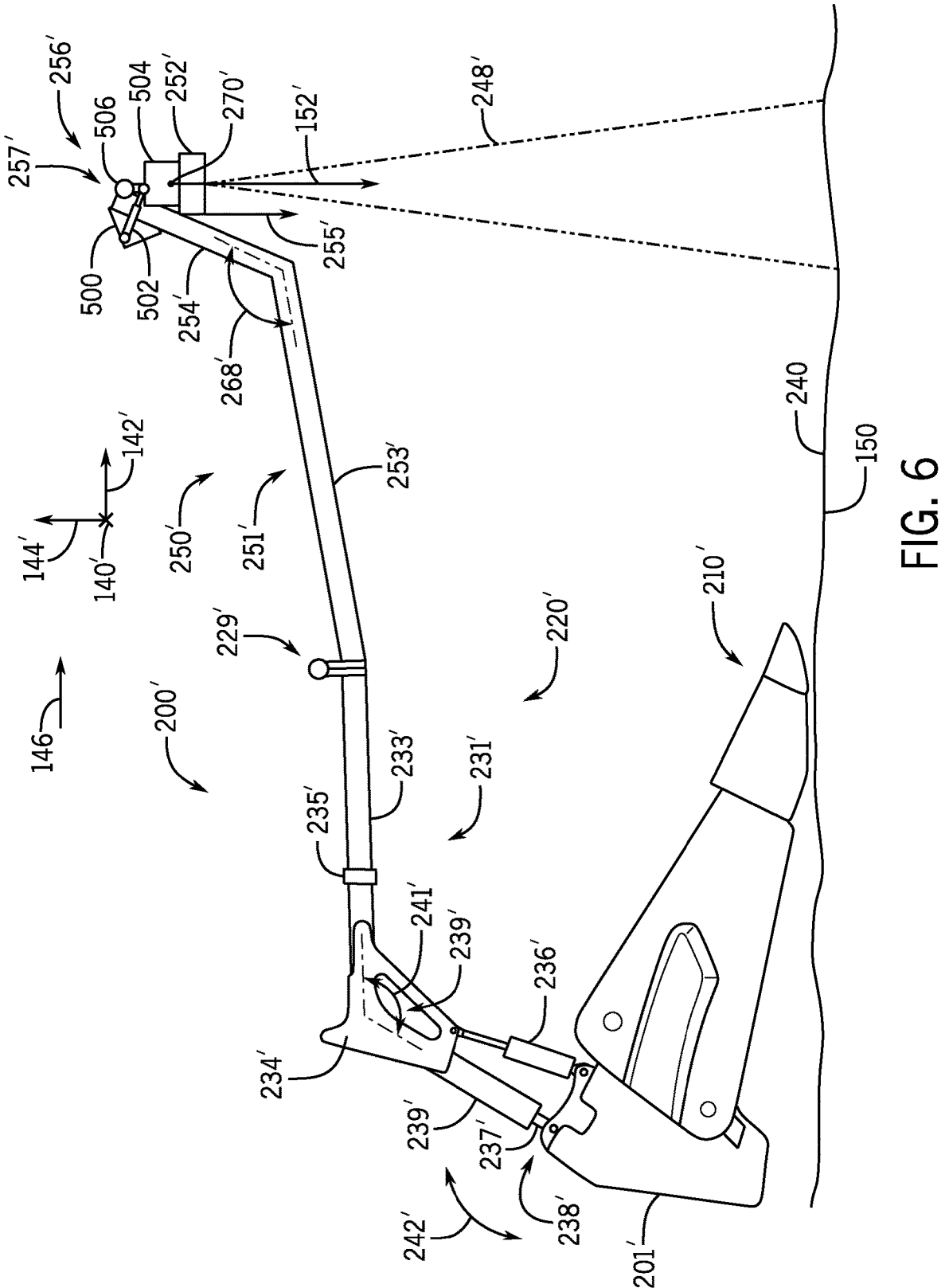

FIG. 5 is a side view of another embodiment of a portion of the header of FIG. 2, in which a reel assembly having a device mounting assembly with a mass is in a first position relative to a frame of the header, in accordance with embodiments of the present disclosure; and FIG. 6 is a side view of the portion of the header of FIG. 5, in which the reel assembly having the device mounting assembly with the mass is in a second position relative to the frame of the header, in accordance with embodiments of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
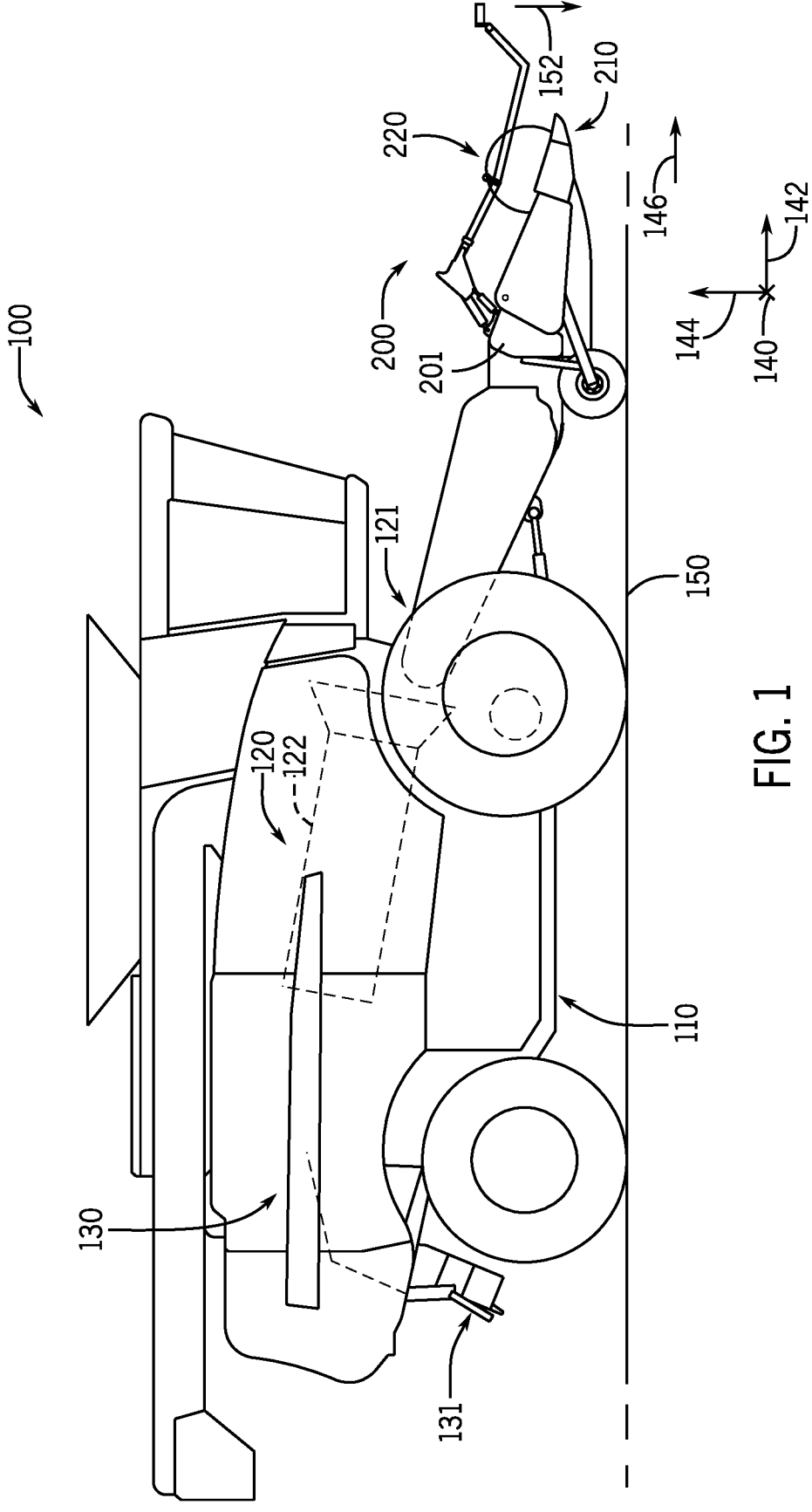
FIG. 1 is a side view of an embodiment of a harvester, in accordance with embodiments of the present disclosure.

Turning to the drawings, FIG. 1 is a side view of an embodiment of a harvester 100 (e.g., agricultural harvester) having a header 200 (e.g., agricultural header). The harvester 100 includes a chassis 110 configured to support the header 200 and an agricultural crop processing system 120. As described in greater detail below, the header 200 is configured to cut crops and to transport the cut crops toward an inlet 121 of the agricultural crop processing system 120 for further processing of the cut crops. The agricultural crop processing system 120 receives cut crops from the header 200 and separates desired crop material from crop residue. For example, the agricultural crop processing system 120 may include a thresher 122 having a cylindrical threshing rotor that transports the crops in a helical flow path through the harvester 100. In addition to transporting the crops, the thresher 122 may separate certain desired crop material (e.g., grain) from the crop residue (e.g., husks and pods) and may enable the desired crop material to flow into a cleaning system located beneath the thresher 122. The cleaning system may remove debris from the desired crop material and transport the desired crop material to a storage compartment within the harvester 100. The crop residue may be transported from the thresher 122 to a crop residue handling system 130, which may remove the crop residue from the harvester 100 via a crop residue spreading system 131 positioned at the aft end of the harvester 100. To facilitate discussion, the harvester 100 and/or its components may be described with reference to a lateral axis or direction 140, a longitudinal axis or direction 142, and a vertical axis or direction 144. The harvester 100 and/or its components may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto belts that convey the cut crops toward the inlet 121 of the agricultural crop processing system 120. As discussed in detail below, the reel assembly 220 includes a reel having multiple fingers extending from a central framework. The central framework is driven to rotate, such that the fingers engage the crops and urge the crops toward the cutter bar assembly 210 and the belts. Additionally, the reel may be supported by multiple arms (e.g., reel arms) that are coupled to a frame 201 of the header 200. Each arm of the multiple arms may be coupled to the frame 201 via a respective pivot joint. For example, one pivot joint is configured to enable a first arm of the multiple arms to pivot (e.g., about the lateral axis 140) relative to the frame 201 of to the header 200, and another pivot joint is configured to enable a second arm of the multiple arms to pivot (e.g., about the lateral axis 140) relative to the frame 201 of the header 200.

In the disclosed embodiments, the reel assembly 220 may include a device mounting assembly. In particular, at least one of the multiple arms may be coupled to a device mounting structure that supports a device. The device may be configured to facilitate detection of terrain features (e.g., a height/position of the crops and/or surface features of the ground) as the harvester 100 travels through the field. For example, the device may be a sensor that is configured to detect the terrain features and to send a signal indicative of the terrain features to an electronic controller for processing. As another example, the device may be a light source (e.g., visible light source) that is configured to illuminate the terrain features to enable detection and visualization by an operator of the harvester 100. In some embodiments, the device mounting assembly may include both the sensor and the light source. Indeed, it should be appreciated that the device mounting assembly may include any number of devices (e.g., 1, 2, 3, 4, 5 or more) and any of a variety of devices, such as any of a variety of devices that emit electromagnetic waves (e.g., sensors; emitters; light sources), coupled to the device mounting structure. Advantageously, in the disclosed embodiments, the reel assembly 220 (e.g., the device mounting assembly of the reel assembly 220) is configured to maintain an orientation of the device relative to a ground 150 (e.g., ground surface) and/or a gravity vector 152 (e.g., pointing toward a center of Earth) as the multiple reel arms move (e.g., pivot about the respective pivot joints) relative to the frame 201 of the header 200.

FIG. 2 is a perspective view of an embodiment of the header 200 that may be employed within the harvester 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., the extent of the header 200 along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at the lateral center of the header 200. However, in other embodiments, the blade support/moving blade assembly may be driven by another suitable mechanism (e.g., located at any suitable position on the header 200). As the harvester 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first lateral belt 202 on a first lateral side of the header 200 and a second lateral belt 203 on a second lateral side of the header 200, opposite the first lateral side. Each belt is driven to rotate by a suitable drive mechanism, such as an electric motor or a hydraulic motor. The first lateral belt 202 and the second lateral belt 203 are driven such that the top surface of each belt moves laterally inward. In addition, the header 200 includes a longitudinal belt 204 positioned between the first lateral belt 202 and the second lateral belt 203 along the lateral axis 140. The longitudinal belt 204 is driven to rotate by a suitable drive mechanism, such as an electric motor or a hydraulic motor. The longitudinal belt 204 is driven such that the top surface of the longitudinal belt 204 moves rearwardly relative to the direction of travel 146.

In the illustrated embodiment, the crops cut by the cutter bar assembly 210 are directed toward the belts at least in part by the reel assembly 220, thereby substantially reducing the possibility of the cut crops falling onto the surface of the field. The reel assembly 220 includes a reel 221 having multiple fingers 222 extending from a central framework 223. The central framework 223 is driven to rotate such that the fingers 222 move (e.g., in a circular pattern). The fingers 222 are configured to engage the crops and urge the cut crops toward the belts. The cut crops that contact the top surface of the lateral belts 202, 203 are driven laterally inwardly to the longitudinal belt 204 due to the movement of the lateral belts 202, 203. In addition, cut crops that contact the longitudinal belt 204 and the cut crops provided to the longitudinal belt 204 by the lateral belts 202, 203 are driven rearwardly relative to the direction of travel 146 due to the movement of the longitudinal belt 204. Accordingly, the belts move the cut agricultural crops through an opening 206 in the header 200 to the inlet 121 of the agricultural crop processing system 120 (FIG. 1).

In the illustrated embodiment, the reel 221 includes multiple sections coupled to one another. In particular, the reel 221 includes a center section 224 (e.g., positioned forward of a center section 205 of the frame 201 of the header 200 relative to the direction of travel 146), a first wing section 225, and a second wing section 226. In the illustrated embodiment, each section of the reel 221 is supported by one or more arms 227 (e.g., reel arms) that are coupled to the frame 201 of the header 200. While the reel 221 includes three sections 224, 225, 226 coupled to the frame 201 of the header 200 via four arms 227, it should be appreciated that the reel 221 may include any number of sections coupled to the frame 201 of the header 200 via any number of arms (e.g., one section coupled to the frame 201 of the header 200 via two arms; two sections coupled to the frame 201 of the header 200 via three arms; four sections coupled to the frame 201 of the header 200 via five arms).

As discussed in detail below, regardless of the number of arms 227, each arm 227 is pivotally coupled to the frame 201 of the header 200 via a respective pivot joint. The pivot joints are configured to enable the arms 227 to pivot (e.g., about the lateral axis 140) relative to the frame 201 of the header 200. An actuator may be coupled to each arm 227 and configured to drive the respective arm 227 to rotate, thereby controlling a position of the reel 221 relative to the frame 201 of the header 200 along the vertical axis 144. Such a configuration may enable the reel 221 to be positioned at an appropriate position along the vertical axis 144 to engage the crops to prepare the crops to be cut by the cutter bar assembly 210 and/or to urge the cut crops toward the belts 202, 203, 204, for example. In some embodiments, each section of the reel 221 may also be configured to slide along its respective arm(s) to enable the reel 221 to move along the longitudinal axis 142 relative to the frame 201 of the header 200. Such a configuration may enable at least a portion of the reel assembly 220 to be positioned forward of the cutter bar assembly 210 relative to the direction of travel 146 to enable the reel assembly 220 to engage the crop to prepare the crop to be cut by the cutter bar assembly 210, for example.

As noted above, the reel assembly 220 may include a device mounting assembly 250. The device mounting assembly 250 may include one or more support structures 251 (e.g., brackets, reel arm extensions) and one or more devices 252 (e.g., sensors, emitters, light sources). The one or more devices 252 may be configured to facilitate detection of terrain features, such as a height/position of the crops and/or surface features of the ground, as the harvester 100 travels through the field. In the illustrated embodiment, each of the arms 227 is coupled to a respective support structure 251 that supports a respective device 252. However, only some of the arms 227 may be coupled to a respective support structure 251 that supports a respective device 252. For example, only the laterally-outer arms 227 may be coupled to a respective support structure 251 and a respective device 252, only the laterally-inner arm(s) 227 may be coupled to a respective support structure 251 and a respective device 252, and/or every other arm 227 (e.g., non-adjacent or alternating arms) may be coupled to a respective support structure 251 and a respective device 252. As discussed in more detail below, regardless of the number of support structures 251 and devices 252 included in the device mounting assembly 250, an orientation of each device 252 relative to the ground 150 and/or the gravity vector 152 (FIG. 1) may be maintained (e.g., substantially maintained) as the reel arms 227 move (e.g., pivot about their respective pivot joints) relative to the frame 201 of the header 200. For example, even if the devices 252 move slightly during movement of the reel arms 227 (e.g., such that the orientation is temporarily lost), the device mounting assembly 250 may stabilize the devices 252 and cause the devices 252 to quickly return to a position in which the orientation relative to the ground 150 and/or the gravity vector 152 is reached again, thereby maintaining the orientation of the each device 252 relative to the ground 150 and/or the gravity vector 152 as the reel arms 227 move (e.g., pivot about their respective pivot joints) relative to the frame 201 of the header 200. In this way, the devices 252 may be pointed downward at the ground 150 regardless of the position of the reel arms 227.

Figure 3:
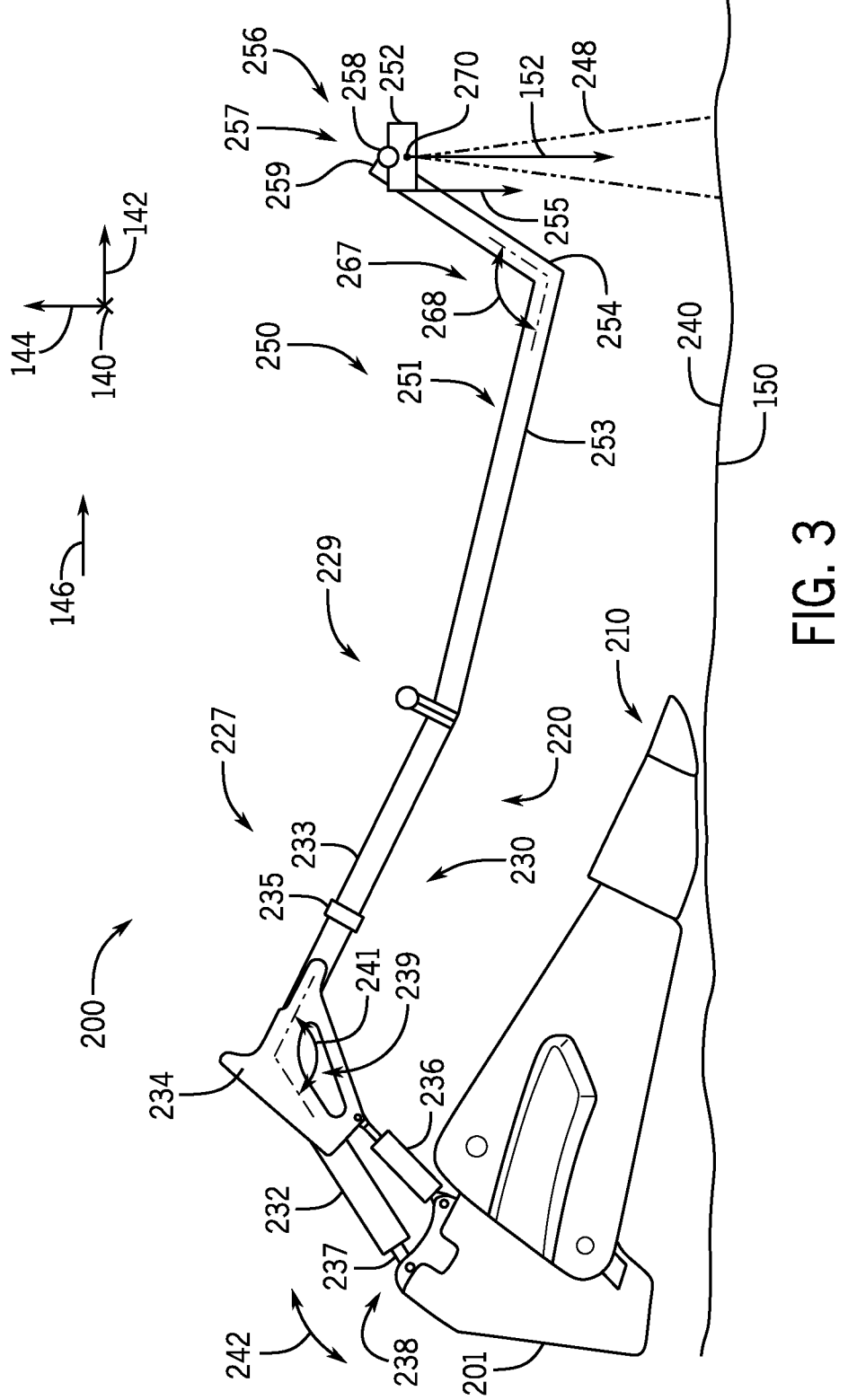
FIG. 3 is a side view of an embodiment of a portion of the header of FIG. 2, in which a reel assembly having a device mounting assembly with a gimbal is in a first position relative to a frame of the header, in accordance with embodiments of the present disclosure.
Figure 4:
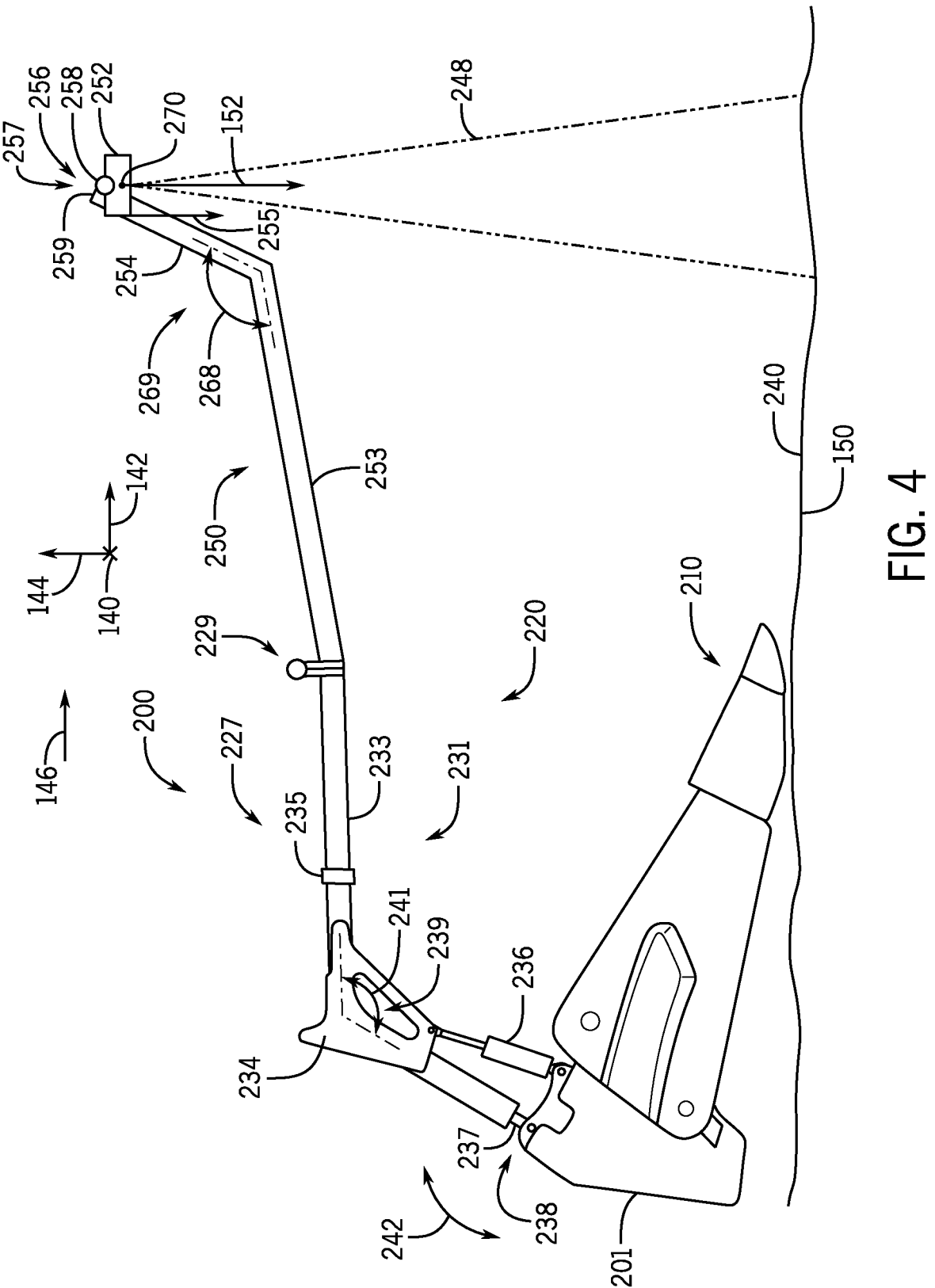
FIG. 4 is a side view of the portion of the header of FIG. 3, in which the reel assembly having the device mounting assembly with the gimbal is in a second position relative to the frame of the header, in accordance with embodiments of the present disclosure.

FIG. 3 is a side view of a portion of the header 200 with the arm 227 in a first position 230 (e.g., a lowered position) relative to the frame 201 of the header 200, and FIG. 4 is a side view of the portion of the header 200 with the arm 227 in a second position 231 (e.g., a raised position) relative to the frame 201 of the header 200. The arm 227 includes a first arm portion 232 and a second arm portion 233 that are coupled together (e.g., in a fixed position relative to one another). In the illustrated embodiment, the first arm portion 232 and the second arm portion 233 are coupled together another via one or more plates 234 (e.g., on opposite lateral sides of the arm portions 232, 233), although the first arm portion 232 and the second arm portion 233 may be coupled together via any suitable fasteners (e.g., bolts, pins, welds).

It should be appreciated that the arm 227 may have any of a variety of shapes or configurations. For example, the first arm portion 232 and the second arm portion 233 may be physically separate structures that are coupled together, or the first arm portion 232 and the second arm portion 233 may be formed as a one-piece structure. Furthermore, the arm 227 may be formed from any number of portions (e.g., 1, 2, 3, 4, 5, or more) having any of a variety of dimensions (e.g., lengths). Moreover, the arm 227 may have any number (e.g., 1, 2, 3, 4, 5, or more) of bends and/or the arm portions may be positioned at any of a variety of angles relative to one another. The reel 221 (FIG. 2) may be coupled to the arm 227 via a slide 235 (e.g., carriage) that enables the reel 221 to slide along the second arm portion 233 to move along the longitudinal axis 142 relative to the frame 201 of the header 200. To facilitate discussion and for image clarity, the reel 221 and the other associated components that couple the reel 221 to the arm 227 are omitted in FIGS. 3 and 4.

The header 200 includes an actuator 236 that may be controlled (e.g., via an electronic controller and/or manually via an operator) to adjust the arm 227 between the first position 230 and the second position 231. As shown, the actuator 236 extends between the frame 201 of the header 200 and the one or more plates 234, although the actuator 236 may be positioned at any suitable location and may be coupled to any suitable structures (e.g., the first arm portion 232, the second arm portion 233) to drive the arm 227 between the first position 230 and the second position 231.

In the illustrated embodiment, the device mounting assembly 250 includes the support structure 251 and the device 252, which may have a field of view of detection 248. The support structure 251 includes a first portion 253 and a second portion 254 that are coupled together (e.g., in a fixed position relative to one another). In the illustrated embodiment, the first portion 253 and the second portion 254 are formed as a one-piece structure. However, the first portion 253 and the second portion 254 may be physically separate structures that are coupled together another via any suitable fasteners (e.g., plates, bolts, pins, welds). It should also be appreciated that the support structure 251 may have any of a variety of shapes or configurations. For example, the support structure 251 may be formed from any number of portions (e.g., 1, 2, 3, 4, 5, or more) having any of a variety of dimensions (e.g., lengths). Moreover, the support structure 251 may have any number (e.g., 1, 2, 3, 4, 5, or more) of bends and/or the portions may be positioned at any of a variety of angles relative to one another.

As shown, the support structure 251 is coupled to the arm 227 via a joint assembly 229. The joint assembly 229 may be configured to maintain the support structure 251 and the arm 227 in fixed positions relative to one another as the actuator 236 drives the reel assembly 220 between the first position 230 and the second position 231. In some embodiments, the joint assembly 229 may also be capable of bending so that the support structure 251 can be folded against the arm 227 (e.g., for transport). However, in other embodiments, the joint assembly 229 may be a rigid connection, such that the support structure 251 cannot be folded against the arm 227 via movement at the joint assembly 229. Furthermore, in some embodiments, the arm 227 and the support structure 251 may be formed as a one-piece structure.

The reel assembly 220 includes a device mounting structure 256 coupled to the device 252 and the support structure 251. The device mounting structure 256 is configured to maintain an orientation of the device 252 relative to the ground 150 and/or the gravity vector 152 as the arm 227 (and the support structure 251) moves relative to the frame 201 of the header 200. That is, the orientation of the device 252 relative to the ground 150 and/or the gravity vector 152 may be the same in the first position 230 of FIG. 3 and in the second position 231 of FIG. 4. As illustrated, the gravity vector 152 extends generally from a center of mass 270 of the device 252 toward the ground 150. In certain embodiments, the gravity vector 152 may extend from another portion of the device 252 and/or another portion of the header 200. In some embodiments, the gravity vector 152 may extend from the center of mass 270 of the device 252 toward the center of Earth. In certain embodiments, the center of mass 270 may be a center of mass of the device mounting structure 251 and/or of the device mounting assembly 250.

In particular, an angle (e.g., device-to-ground angle) may be maintained between an axis 255 (e.g., a device axis) of the device 252 and the ground 150 and/or between the axis 255 of the device 252 and the gravity vector 152. For example, while the header 200 is stationary on the ground 150, the angle may be maintained between the axis 255 and the ground 150 and between the axis 255 of the device 252 and the gravity vector 152. Additionally, while the header 200 travels over the ground 150 (e.g., travels over a generally flat surface), the angle may be maintained between the axis 255 and the ground 150 and between the axis 255 of the device 252 and the gravity vector 152. Furthermore, while the header 200 travels over the ground 150 (e.g., travels uphill or downhill), the angle may be maintained between the axis 255 and the gravity vector 152. In order to achieve this, the orientation of the device 252 relative to the support structure 251, the reel arm 227, and/or the frame 201 of the header 200 may change. In some embodiments, the axis 255 of the device 252 may be oriented to generally align with the gravity vector 152 (e.g., extend generally parallel to the gravity vector) and/or may be oriented so that a center axis of electromagnetic waves emitted by the device 252 generally align with the gravity vector 152. However, the axis 255 of the device 252 may be at a different angle relative to the gravity vector 152. For example, the axis 255 may be oriented so that the center axis of the electromagnetic waves emitted by the device 252 generally travel rearwardly or forward relative to the direction of travel 146 (e.g., as the reel arm 227 adjusts between the first position 230 and the second position 231).

As shown, the device mounting structure 256 of the device mounting assembly 250 includes a gimbal 258 configured to maintain the angle between the axis 255 and the ground 150 on which the header 200 is positioned and/or the gravity vector 152 as the arm 227 rotates relative to the frame 201. For example, the gimbal 258 may be an active gimbal including accelerometer(s) that detect acceleration forces (e.g., motion) of the device 252 and/or motor(s) configured to adjust the device 252 to maintain the angle between the axis 255 and the ground 150 on which the header 200 is positioned and/or the gravity vector 152 as the arm 227 rotates relative to the frame 201. For example, an electronic controller of the gimbal 258 may receive signals from the accelerometer(s) and output control signals to the motor(s) to adjust the device 252. In certain embodiments, the gimbal 258 may be a passive device, such as a gyroscope, configured to move as the arm 227 rotates relative to the frame 201 due to the force of gravity.

In some embodiments, the gimbal 258 may be configured to enable movement (e.g., rotation) of the device 252 about the lateral axis 140 (e.g., pitch direction), the longitudinal axis 142 (e.g., a roll direction), and/or about the vertical axis 144 (e.g., a yaw direction). In some embodiments, the gimbal 258 may be configured to block movement of the device 252 in the roll direction and/or in the yaw direction. In some embodiments, the gimbal 258 may be configured to enable the movement of the device 252 in the pitch direction, but may limit a range of movement of the device 252 in the pitch direction. In this way, the gimbal 258 may enable adjustments to compensate for changes in the position of the reel arm 227, while also causing the device 252 to continue to effectively monitor the terrain features at a desired location forward of the header 200 even as the header 200 travels uphill or downhill, for example.

As shown, the gimbal 258 is rigidly coupled to the device 252 and pivotally coupled to an end 259 (e.g., distal end) of the support structure 251 via a first pivot joint 257. An end 237 (e.g., proximal end) of the arm 227 is also pivotally coupled to the frame 201 of the header 200 via a second pivot joint 238 (e.g., arm-to-frame pivot joint). By blocking movement of the device 252 in the roll and/or yaw directions, while enabling movement of the device 252 in the pitch direction, the device mounting assembly 250 may enable the device 252 to accurately monitor the ground 150 and terrain features of the ground 150 as the harvester 100 moves over the ground 150 (e.g., travels uphill or downhill in the direction of travel 146) and as the reel arm 227 moves relative to the frame 201 of the header 200. For example, by blocking movement of the device 252 in the roll and/or yaw directions, the device mounting assembly 250 may reduce an effect of a changing contour of the ground 150, such as due to driving on side slopes of the ground 150, on the ability of the device 252 to accurately monitor the terrain features.

In the illustrated embodiment, the first arm portion 232 and the second arm portion 233 are joined at a bend 239 that faces downwardly (e.g., toward a soil surface 240 of the ground 150) and that has an angle 241 (e.g., angle between respective central axes of the first arm portion 232 and the second arm portion 233). Additionally, the first portion 253 and the second portion 254 are joined at a bend 267 that faces upwardly (e.g., away from the soil surface 240, opposite from the bend 239) and that has an angle 268 (e.g., angle between respective central axes of the first portion 253 and the second arm portion 254). As shown, the angles 241, 268 may be approximately equal to one another (e.g., within 1, 2, 3, 4, or 5 percent to account for manufacturing variability). In some embodiments, the angles 241, 268 may be obtuse angles and may be approximately 120, 125, 130, 135, 140, 145, or 150 degrees. In some embodiments, the angles 241, 268 may be between approximately 95-150 degrees, 105 to 140 degrees, or 115 to 130 degrees. In the illustrated embodiment, the portions of the arm 227 and the portions of the support structure 251 have corresponding lengths (e.g., axial lengths, along respective central axes). In particular, a length of the first arm portion 232 is approximately equal to a length of the second portion 254, and a length of the second arm portion 233 is approximately equal to a length of the first portion 253. However, it should be appreciated that the arm 227 and the support structure 251 may have any of a variety of geometries that enable the reel assembly 220 to cause the device 252 to maintain the orientation relative to the ground 150 and/or the gravity vector 152 as the arm 227 moves relative to the frame 201 of the header 200. Indeed, the angles 241, 268 may each be any of a variety of angles and/or may not be approximately equal to one other (e.g., may be substantially different from one another). Furthermore, the portions of the arm 227 and the portions of the support structure 251 may not have corresponding lengths (e.g., may be substantially different from one another).

With the disclosed features, when the arm 227 pivots about the second pivot joint 238 (e.g., as shown by arrows 242) to move between the first position 230 and the second position 231, the device mounting structure 256 pivots about the first pivot joint 257 (e.g., the device mounting structure 256 pivots relative to the support structure 251). The device 252 pivots with the device mounting structure 256 and relative to the support structure 251, such that the device mounting assembly 250 maintains the angle and an orientation of the device 252 relative to the ground 150 and/or the gravity vector 152. When the device 252 is a sensor, this configuration may enable the sensor to detect terrain features in a particular region relative to the harvester 100 (e.g., forward of the harvester 100) regardless of the position of the reel assembly 220 relative to the frame 201 of the header 200, for example. When the device 252 is a light source, maintaining the orientation in this way may enable the light source to illuminate terrain features in a particular region of the soil surface 240 relative to the harvester 100 (e.g., to always illuminate a region forward of the harvester 100), for example.

It should be appreciated that various other configurations and components may be used to maintain the orientation of the device 252 relative to the ground 150 and/or the gravity vector 152. For example, FIG. 5 is a side view of a portion of the header 200', in which a reel assembly 220' having a device mounting assembly 250' in a first position 230'. FIG. 6 is a side view of the portion of the header 200', in which the reel assembly 220' having the device mounting assembly 250' in a second position 231'. The reel assembly 220' and its components shown in FIGS. 5 and 6 may have any of the features of the reel assembly 220 and its components shown and described with respect to FIGS. 1-4. For example, FIGS. 5 and 6 illustrate an arm 227', which may have any of the features of the arm 227 shown and described with respect to FIGS. 3 and 4. FIGS. 5 and 6 also illustrate a support structure 251', which may have any of the features of the support structure 251 shown and described with respect FIGS. 3 and 4. Further, FIGS. 5 and 6 illustrate a device 252', which may have any of the features of the device 252 shown and described with respect FIGS. 3 and 4.

As shown, the arm 227' (e.g., reel arm) includes a first arm portion 232' and a second arm portion 233' that are coupled together (e.g., in a fixed position relative to one another). In the illustrated embodiment, the first arm portion 232' and the second arm portion 233' are coupled together another via one or more plates 234'. The reel 221' (FIG. 2) may be coupled to the arm 227' via a slide 235' (e.g., carriage) that enables the reel 221' to slide along the second arm portion 233' to move along the longitudinal axis 142' relative to the frame 201' of the header 200'. To facilitate discussion and for image clarity, the reel 221' and the other associated components that couple the reel 221' to the arm 227' are omitted in FIGS. 5 and 6. As shown, the first arm portion 232' and the second arm portion 233' are joined at a bend 239' that faces downwardly (e.g., toward a soil surface 240') and that has an angle 241', although other configuration are envisioned.

An actuator 236' may be controlled (e.g., via an electronic controller and/or manually via an operator) to adjust the arm 227' between the first position 230' and the second position 231'. In the illustrated embodiment, the device mounting assembly 250' includes the support structure 251' and a device 252'. The support structure 251' includes a first portion 253' and a second portion 254' that are coupled together (e.g., in a fixed position relative to one another). Additionally, the first portion 253' and the second portion 254' are joined at a bend 267' that faces upwardly (e.g., away from the soil surface 240', opposite from the bend 239') and that has an angle 268'.

In the illustrated embodiment, the support structure 251' is coupled to the arm 227' via a joint assembly 229'. The joint assembly 229' may be configured to maintain the support structure 251' and the arm 227' in fixed positions relative to one another as the actuator 236' drives the reel assembly 220' between the first position 230' and the second position 231'. In some embodiments, the joint assembly 229' may also be capable of bending so that the support structure 251' can be folded against the arm 227' (e.g., for storage and/or transport).

The reel assembly 220' includes a device mounting structure 256' coupled to the device 252' and the support structure 251'. The device mounting structure 256' is configured to maintain an orientation of the device 252' relative to the ground 150 and/or the gravity vector 152' as the arm 227' (and the support structure 251') moves relative to the frame 201' of the header 200'. That is, the orientation of the device 252' relative to the ground 150 and/or a gravity vector 152' may be the same in the first position 230' of FIG. 5 and in the second position 231' of FIG. 6.

In particular, an angle (e.g., device-to-ground angle) may be maintained between an axis 255' (e.g., a device axis) of the device 252' and the ground 150 and/or between the axis 255' of the device 252' and the gravity vector 152'. The axis 255' of the device 252' may be any suitable angle relative to the gravity vector 152'.

As shown, the device mounting structure 256' of the device mounting assembly 250' includes a bracket 500, a damper 502 coupled (e.g., rigidly coupled; non-rotatably coupled) to the bracket 500, and a mass 504 coupled (e.g., rigidly coupled; non-rotatably coupled) to the device 252' and the damper 502. Additionally, the mass 504 is rotatably coupled to the end 259' of the support structure 251' via a pin

506 of the device mounting assembly 250'. The device mounting structure 256' is configured to maintain the angle between the axis 255' and the ground 150 on which the header 200' is positioned and/or the gravity vector 152' as the arm 227' rotates relative to the frame 201'. For example, the mass 504 and the device 252' may rotate about a first pivot joint 257' having the pin 506 as the arm 227' and the support structure 251' rotate. Gravity pulls the mass 504 toward the ground 150 and/or into alignment with the gravity vector 152'. Furthermore, as the mass 504 and the device 252' rotate about the pin 506, the damper 502 coupled to support structure 251' (e.g., via the bracket 500) is configured to dampen the movement (e.g., rotation) of the mass 504 and the device 252', thereby maintaining the orientation between the device 252' and the ground 150 and/or the gravity vector 152'.

As illustrated, the gravity vector 152' extends generally from a center of mass 270' of the device 252' and the mass 504 toward the ground 150. In certain embodiments, the gravity vector 152' may extend from the device 252' and/or another portion of the header 200'. In some embodiments, the gravity vector 152' may extend from the center of mass 270' toward the center of Earth. In certain embodiments, the center of mass 270' may be a center of mass of the device mounting structure 251' and/or of the device mounting assembly 250'.

In the illustrated embodiment, the device mounting structure 256' is configured to block movement of the device 252' about the longitudinal axis 142' (e.g., a roll direction) and the vertical axis 144' (e.g., a yaw direction) and to enable movement (e.g., rotation) of the device 252' about the lateral axis 140' (e.g., a pitch direction). By blocking movement of the device 252' in the roll and yaw directions, while enabling movement of the device 252' in the pitch direction, the device mounting assembly 250' may enable the device 252' to accurately monitor the ground 150 and terrain features of the ground 150 as the harvester 100 moves over the ground 150 (e.g., travels uphill or downhill in the direction of travel 146). For example, by blocking movement of the device 252' in the roll and/or yaw directions, the device mounting assembly 250' may reduce an effect of a changing contour of the ground 150, such as due to driving on side slopes, on the ability of the device 252' to accurately monitor the terrain features. In certain embodiments, the bracket 500 may be integrally formed with the support structure 251'. In some embodiments, the bracket 500 may be omitted, such that the damper 502 is directly coupled to the support structure 251'. Furthermore, in some embodiments, the pin 506 may be replaced with a ball joint and additional damper(s) may be added. In such cases, the device mounting structure 256' may enable the device 252' to move in multiple directions (e.g., the pitch direction and the roll direction).

In the illustrated embodiment, an end 237' (e.g., proximal end) of the arm 227' is also pivotally coupled to the frame 201' of the header 200' via a second pivot joint 238' (e.g., arm-to-frame pivot joint). The first arm portion 232' and the second arm portion 233' are joined at a bend 239' that faces downwardly (e.g., toward a soil surface 240 of the ground 150) and that has an angle 241' (e.g., angle between respective central axes of the first arm portion 232' and the second arm portion 233'). Additionally, the first portion 253' and the second portion 254' are joined at a bend 267' that faces upwardly (e.g., away from the soil surface 240, opposite from the bend 239') and that has an angle 268' (e.g., angle between respective central axes of the first portion 253' and the second arm portion 254'). As shown, the angles 241', 268' may be approximately equal to one another (e.g., within 1, 2, 3, 4, or 5 percent to account for manufacturing variability). In some embodiments, the angles 241', 268' may be obtuse angles and may be approximately 120, 125, 130, 135, 140, 145, or 150 degrees. In some embodiments, the angles 241', 268' may be between approximately 95-150 degrees, 105 to 140 degrees, or 115 to 130 degrees. In the illustrated embodiment, the portions of the arm 227' and the portions of the support structure 251' have corresponding lengths (e.g., axial lengths, along respective central axes). In particular, a length of the first arm portion 232' is approximately equal to a length of the second portion 254', and a length of the second arm portion 233' is approximately equal to a length of the first portion 253. However, it should be appreciated that the arm 227' and the support structure 251' may have any of a variety of geometries that enable the reel assembly 220' to cause the device 252' to maintain the orientation relative to the ground 150 and/or the gravity vector 152' as the arm 227' moves relative to the frame 201' of the header 200'. Indeed, the angles 241', 268' may each be any of a variety of angles and/or may not be approximately equal to one other (e.g., may be substantially different from one another). Furthermore, the portions of the arm 227' and the portions of the support structure 251' may not have corresponding lengths (e.g., may be substantially different from one another).

With the disclosed features, when the arm 227' pivots about the second pivot joint 238' (e.g., as shown by arrows 242') to move between the first position 230' and the second position 231', the device mounting structure 256' pivots about the first pivot joint 257' (e.g., the device mounting structure 256' pivots relative to the support structure 251'). The mass 504 and the device 252' pivot about the pin 506 and relative to the support structure 251', and the damper 502 at least partially blocks (e.g., dampens) the pivoting motion of the mass 504 and the device 252', such that the device mounting assembly 250' maintains the angle and an orientation of the device 252' relative to the ground 150 and/or the gravity vector 152'. When the device 252' is a sensor, this configuration may enable the sensor to detect terrain features in a particular region relative to the harvester 100 (e.g., forward of the harvester 100) regardless of the position of the reel assembly 220' relative to the frame 201' of the header 200', for example. When the device 252' is a light source, maintaining the orientation in this way may enable the light source to illuminate terrain features in a particular region of the soil surface 240 relative to the harvester 100 (e.g., to always illuminate a region forward of the harvester 100), for example.

As noted above, the support structure may support any number of devices (e.g., 1, 2, 3, 4, 5 or more) and any of a variety of devices, such as any of a variety of devices that emit electromagnetic waves (e.g., sensors; emitters; sources of visible light). For example, the device may be replaced by any other type of device, such as a source of visible light. Furthermore, the device and one or more additional devices, such as a source of visible light, may be rigidly coupled to (e.g., in a fixed position relative to) the device mount disclosed herein. In such cases, the device and the one or more additional devices may each maintain their respective orientation relative to the frame of the header as the arms move relative to the frame of the header. In certain embodiments, the device may include an ultrasonic sensor, a Radio Detection and Ranging (radar) sensor, a Light Detecting and Ranging (lidar) sensor, and/or a camera sensor.

In embodiments with the device including a source of visible light, the device may be oriented to direct light rearwardly (e.g., relative to the direction of travel) and downwardly (e.g., toward the ground). Such a configuration may enable the source of visible light to illuminate at least a portion of the cutter bar assembly of the agricultural header, at least a portion of the reel assembly of the agricultural header, and/or other portions of the agricultural header. However, it should be appreciated that the source of visible light may be positioned at any of a variety of locations along the support structure of the device mounting assembly and/or may have any of a variety of orientations. Furthermore, multiple sources of visible light and/or other devices may be positioned at any of a variety of locations along the support structure and may have any of a variety of orientations relative to the support structure.

It should also be appreciated that any of the devices disclosed herein (e.g., the device 252, 252', and any other device) may include a power source (e.g., battery) and/or may be coupled to a power source (e.g., via a power cable). Furthermore, these components may be coupled to an electronic controller having a processor and a memory. The electronic controller may control operation of the device and/or processes signals received from the device. For example, the electronic controller may control operation of the device and may also receive signals from the device. The processor may process the signals to determine the terrain features, such as a presence of rocks on the ground and/or a height of the crops, and then may provide control signals to adjust the cutter bar assembly to an appropriate height based on the terrain features, for example. In such cases, the processor may be any suitable type of computer processor or microprocessor capable of executing computer-executable code. The processor may also include multiple processors that may perform the operations described herein. The memory may represent non-transitory computer-readable media (e.g., any suitable form of memory or storage) that may store the processor-executable code used by the processor to perform various techniques described herein. It should be noted that non-transitory merely indicates that the media is tangible and not a signal.

While the disclosed embodiments relate to the device mounting assembly that is configured to mount the device to the arm that supports the reel to facilitate discussion, it should be appreciated that the device mounting assembly may be used to mount the device to an arm (e.g., support structure) that is movably attached or non-movably attached to another part of the header or the harvester (e.g., the frame of the header, the chassis or other structure of the harvester). For example, a first end portion of an arm may be coupled to the frame of the header to position the device forward of the cutter bar assembly, and the device mounting assembly (e.g., the gimbal or the mass/damper disclosed herein) may be coupled to a second end portion of the arm and may be configured to maintain the orientation of the device relative to the ground and/or the gravity vector.

While only certain features have been illustrated and described herein, many modifications and changes will occur to those skilled in the art. It is, therefore, to be understood that the appended claims are intended to cover all such modifications and changes as fall within the true spirit of the disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A reel assembly for an agricultural header, comprising:
a reel arm comprising a respective first end portion configured to rotatably couple to a frame of the agricultural header, wherein the reel arm is configured to support a reel of the reel assembly; and
a device mounting assembly comprising a support structure that extends from a respective second end portion of the reel arm and is configured to support a device, wherein the device is configured to monitor a terrain feature, and the device mounting assembly is configured to enable the device to rotate relative to the reel arm and the support structure to maintain an orientation between the device and a ground on which the agricultural header is positioned as the reel arm and the support structure rotate together relative to the frame of the agricultural header.

2. The reel assembly of claim 1, wherein the device mounting assembly is configured to position the device forward of a cutter bar assembly of the agricultural header relative to a direction of travel.

3. The reel assembly of claim 1, comprising the device, wherein the device comprises a sensor that is configured to detect the terrain feature.

4. The reel assembly of claim 3, wherein the sensor is configured to emit electromagnetic waves to facilitate monitoring the terrain feature forward of a cutter bar assembly of the agricultural header.

5. The reel assembly of claim 1, wherein the device mounting assembly is configured to block movement of the device relative to the frame of the agricultural header in a roll direction and in a yaw direction as the reel arm and the support structure rotate together relative to the frame of the agricultural header.

6. The reel assembly of claim 1, wherein the device mounting assembly is configured to enable movement of the device relative to the frame of the agricultural header in a pitch direction as the reel arm and the support structure rotate together relative to the frame of the agricultural header.

7. The reel assembly of claim 1, wherein the device mounting assembly comprises a pin mounted to the support structure and a mass coupled to the pin and rigidly coupled to the device, and the mass and the device are configured to rotate relative to the reel arm and the support structure via the pin.

8. The reel assembly of claim 7, wherein the device mounting assembly comprises a damper configured to facilitate movement of the mass and the device relative to the reel arm and the support structure.

9. The reel assembly of claim 1, wherein the device mounting assembly comprises a gimbal.

10. A device mounting assembly for an agricultural header, comprising:
a support structure configured to be coupled to a reel arm of the agricultural header;
a device mounting structure coupled to the support structure; and
a device coupled to the device mounting structure and configured to monitor a terrain feature, wherein the device mounting structure is configured to enable the device to rotate relative to the reel arm and the support structure to maintain an orientation between the device and a ground on which the agricultural header is positioned as the reel arm and the support structure rotate together relative to a frame of the agricultural header.

11. The device mounting assembly of claim 10, wherein the device is configured to emit electromagnetic waves to facilitate monitoring the terrain feature forward of a cutter bar assembly of the agricultural header.

12. The device mounting assembly of claim 10, wherein the device comprises at least one of an ultrasonic sensor, a Radio Detection and Ranging (radar) sensor, a Light Detecting and Ranging (lidar) sensor, a camera sensor, or a combination thereof.

13. The device mounting assembly of claim 10, wherein the device mounting structure comprises a pin rotatably mounted to the support structure and a mass rigidly coupled to the pin and to the device.

14. The device mounting assembly of claim 13, wherein the device mounting structure comprises a damper configured to facilitate movement of the mass and the device relative to the reel arm and the support structure.

15. The device mounting assembly of claim 10, wherein the device mounting structure comprises a gimbal.

16. The device mounting assembly of claim 10, wherein the device mounting assembly is configured to:

block movement of the device relative to the frame of the agricultural header in a roll direction, in a yaw direction, or both, as the reel arm and the support structure rotate together relative to the frame of the agricultural header; and enable movement of the device relative to the frame of the agricultural header in a pitch direction as the reel arm and the support structure rotate together relative to the frame of the agricultural header.

17. A header for an agricultural harvester, comprising:

a cutter bar assembly coupled to a frame of the header and configured to cut crops as the agricultural harvester travels through a field;

a reel arm coupled to the frame of the header; and a device mounting assembly configured to couple a device that is configured to monitor terrain features to the reel arm, wherein the device mounting assembly is configured to maintain an orientation between the device and a ground on which the header is positioned as the reel arm and a support structure of the device mounting assembly rotate together relative to the frame of the header.

18. The header of claim 17, wherein the reel arm is configured to support a reel of a reel assembly that rotates to prepare the crops to be cut by the cutter bar assembly as the agricultural harvester travels through the field.

19. The header of claim 17, wherein the device mounting assembly comprises a pin rotatably mounted to the support structure, a mass coupled to the pin and to the device, and a damper configured to facilitate movement of the mass and the device relative to the reel arm and the support structure.

20. The header of claim 17, wherein the device mounting assembly comprises a gimbal.

\* \* \* \* \*